(12) United States Patent
Blount et al.

(10) Patent No.: US 10,657,150 B2
(45) Date of Patent: *May 19, 2020

(54) SECURE DELETION OPERATIONS IN A WIDE AREA NETWORK

(71) Applicant: INTERNATIONAL BUSINESS MACHINES CORPORATION, Armonk, NY (US)

(72) Inventors: Lawrence C. Blount, Tucson, AZ (US); Deepak R. Ghuge, Ahmednagar (IN); Shah Mohammad R. Islam, Tucson, AZ (US); Sandeep R. Patil, Pune (IN); Riyazahamad M. Shiraguppi, Pune (IN); Renu Tewari, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 15/793,494

(22) Filed: Oct. 25, 2017

(65) Prior Publication Data

US 2018/0046692 A1    Feb. 15, 2018

Related U.S. Application Data

(63) Continuation of application No. 15/293,482, filed on Oct. 14, 2016, now Pat. No. 9,870,414, which is a
(Continued)

(51) Int. Cl.
*G06F 16/00* (2019.01)
*G06F 16/27* (2019.01)
(Continued)

(52) U.S. Cl.
CPC ............ *G06F 16/27* (2019.01); *G06F 16/162* (2019.01); *G06F 16/172* (2019.01)

(58) Field of Classification Search
CPC .......... G06F 17/30575; G06F 11/2058; G06F 11/2069; G06F 11/2074; G06F 11/2082;
(Continued)

(56) References Cited

U.S. PATENT DOCUMENTS 6,032,227 A    2/2000  Shaheen et al.
6,070,174 A    5/2000  Starek et al.
(Continued)

FOREIGN PATENT DOCUMENTS

JP    2010061537 A    3/2010

OTHER PUBLICATIONS

Muthitacharoen et al., "A Low-bandwidth Network File System" (2 pages).
(Continued)

*Primary Examiner* — Merilyn P Nguyen
(74) *Attorney, Agent, or Firm* — Griffiths & Seaton PLLC

(57) ABSTRACT

Methods, systems, and computer program products are provided for performing a secure delete operation in a wide area network (WAN) including a cache site and a home site. A method includes identifying a file for deletion at the cache site, determining whether the file has a copy stored at the home site, detecting a location of the copy at the home site prior to a disconnection event of the cache site from the home site, deleting the file from the cache site during the disconnection event, and in response to the secure deletion of the file not being complete during the disconnection event, indicating on a table a remote inode number assigned to the copy associated with the file at the home site, a name under which the copy is saved, and a list of data chunk tuples specifying selected data of the copy to undergo secure deletion.

18 Claims, 4 Drawing Sheets

Related U.S. Application Data continuation of application No. 13/611,460, filed on Sep. 12, 2012, now Pat. No. 9,495,377.

(51) Int. Cl.
*G06F 16/16* (2019.01)
*G06F 16/172* (2019.01)

(58) Field of Classification Search
CPC ......... G06F 17/30117; G06F 17/30132; G06F 16/162; G06F 16/172; G06F 16/27; G06F 21/6218; H04L 67/1095
See application file for complete search history.

(56) References Cited

U.S. PATENT DOCUMENTS

| | | | |
|---|---|---|---|
| 7,203,708 | B2 | 4/2007 | Liu et al. |
| 7,243,163 | B1 | 7/2007 | Friend et al. |
| 7,702,953 | B2 | 4/2010 | Spear et al. |
| 7,831,560 | B1 | 11/2010 | Spertus et al. |
| 7,930,755 | B1 | 4/2011 | Miller |
| 7,975,119 | B2 | 7/2011 | Erez |
| 8,285,681 | B2 | 10/2012 | Prahlad et al. |
| 9,137,262 | B2 * | 9/2015 | Qureshi ............... H04L 67/10 |
| 2005/0193245 | A1 | 9/2005 | Hayden et al. |
| 2006/0080471 | A1 | 4/2006 | Powell et al. |
| 2006/0190506 | A1 | 8/2006 | Rao et al. |
| 2008/0010326 | A1 * | 1/2008 | Carpenter ............. G06F 3/0623 |
| 2008/0091691 | A1 | 4/2008 | Tsuji |
| 2008/0320052 | A1 | 12/2008 | Chandrachari et al. |
| 2009/0006869 | A1 | 1/2009 | Satya Sudhakar |
| 2009/0063596 | A1 | 3/2009 | Nasu et al. |
| 2009/0138808 | A1 | 5/2009 | Moromisato et al. |
| 2009/0252325 | A1 | 10/2009 | Reus et al. |
| 2009/0298468 | A1 | 12/2009 | Hsu |
| 2010/0146582 | A1 | 6/2010 | Jaber et al. |
| 2010/0174865 | A1 | 7/2010 | Koester |
| 2010/0250632 | A1 | 9/2010 | Uno |
| 2010/0325296 | A1 | 12/2010 | Hamasaki et al. |
| 2011/0087696 | A1 | 4/2011 | Lacapra |
| 2011/0145363 | A1 | 6/2011 | Ananthanarayanan et al. |
| 2011/0289271 | A1 | 11/2011 | Nagpal et al. |
| 2013/0066930 | A1 | 3/2013 | Kamei et al. |
| 2013/0212070 | A1 | 8/2013 | Saika et al. |
| 2013/0218848 | A1 | 8/2013 | Gunda et al. |

OTHER PUBLICATIONS

Anonymous, "Method and System to Provide a Secure Service Advertising Protocol for Advertising Services from a Cloud Computing Infrastructure," Apr. 15, 2010 (6 pages).

Reardon et al., "User-Level Secure Deletion on Log-structured File Systems," ACM, May 2012 (11 pages).

* cited by examiner

SECURE DELETION OPERATIONS IN A WIDE AREA NETWORK

CROSS-REFERENCE TO RELATED APPLICATIONS

This Application is a Continuation of U.S. Pat. No. 9,870,414, filed Oct. 14, 2016, which is a Continuation of U.S. Pat. No. 9,495,377, filed Sep. 12, 2012, the entirety of each of which hereby are incorporated by reference.

BACKGROUND OF THE INVENTION

Field of the Invention

The present invention relates in general to wide area networks, and more particularly, to secure deletion of data after long term disconnection between cache and remote nodes included in wide area networks.

Description of the Related Art

Cloud computing is a paradigm in which tasks are assigned to a combination of connections, software, and services that are accessed over a network of servers and connections collectively known as "the cloud." The cloud allows sharing of large amounts of file data in a consistent, efficient, and reliable manner across a wide-area network (WAN). WAN data storage systems include cluster file systems in operable communication with "clusters" of interconnected independent nodes working together to act as a single system. A cluster file system manages data stored within a cluster (also called "home site") and provides client nodes with access to all files located on storage devices in the file system.

The cluster generally stores and sources data, while the client nodes include cache sites that cache data fetched from the cluster locally. For example, during operation when a client application tries to access any file for the first time, the file is fetched from the cluster and copied to the cache site thereby reducing use of WAN bandwidth.

SUMMARY OF THE INVENTION

Cluster file systems are configured to allow cache sites of client nodes to operate in a read-only mode, a local update mode, or a single-writer mode. The read-only mode allows the cache site to only read data without performing write operations on the cached files. The local update mode allows the cache site to read an initial version of a file from the cluster or home site and can perform write operations locally to be stored at the cache site without synchronizing the write operations with the cluster. The single-writer mode allows the cache site to perform write operations after fetching the file from the cluster and synchronization of the write operations with the cluster is asynchronously performed.

In some cases, the cluster and the cache site may become disconnected. Typically, during a disconnection, the cache site continues to service files that are already cached (e.g., performing write operations on data and/or metadata) and queues the operations in a memory queue so that when connectivity returns the cluster synchronizes the operations by reading the memory queue of the cache site. However, during a long-term disconnection or outage, the memory queue may become lost, deleted or corrupted. As a result, the cluster may not successfully synchronize its data with that of the cluster. Additionally, if the cache site is performing a secure delete operation during disconnection rather than a normal delete operation, the cluster may not recognize the delete operation is a secure delete operation and hence, when the cluster undergoes synchronization, it may not perform pattern writes associated with the secure delete operation. Consequently, the system, and hence the user, may not be aware that the secure delete operation has not been completed.

In view of the foregoing, methods, systems, and computer program products are provided that ensure the completion of secure delete operations in a wide area network (WAN) including a cache site and a home site. In one embodiment, by way of example only, a method includes: during a disconnection event of the cache site and the home site, identifying and receiving a request to perform a secure deletion of a file at the cache site; determining whether the file has a copy stored at the home site; detecting a location of the copy at the home site prior to a disconnection event of the cache site from the home site; in response to the secure deletion of the file not being complete during the disconnection event, indicating on a table a remote inode number assigned to the copy associated with the file at the home site, a name under which the copy is saved, and a list of data chunk tuples specifying selected data of the copy to undergo secure deletion; securely deleting the file from the cache site during the disconnection event by performing defined write patterns for each block of the file; and identifying the file for secure deletion by identifying the selected data in the file for secure deletion on the cache site; wherein: the step of detecting the location includes detecting a location of the selected data in the file at the home site prior to the disconnection event, and the list of data chunk tuples includes a start offset and an end offset for each data chunk tuple.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The illustrated embodiments below are provided for ensuring the completion of secure delete operations not only on cache sites, but also on home or cluster sites. In particular, the embodiments feature identifying files that are to undergo secure delete operations at the cache site and locating corresponding copies of the files at the home site prior to a disconnection event, and performing a secure delete operation of the identified files immediately after reconnection of the cache site and the home site. In this way, data is completely unrecoverable not only from the cache site, but also from the home site.

Figure 1:
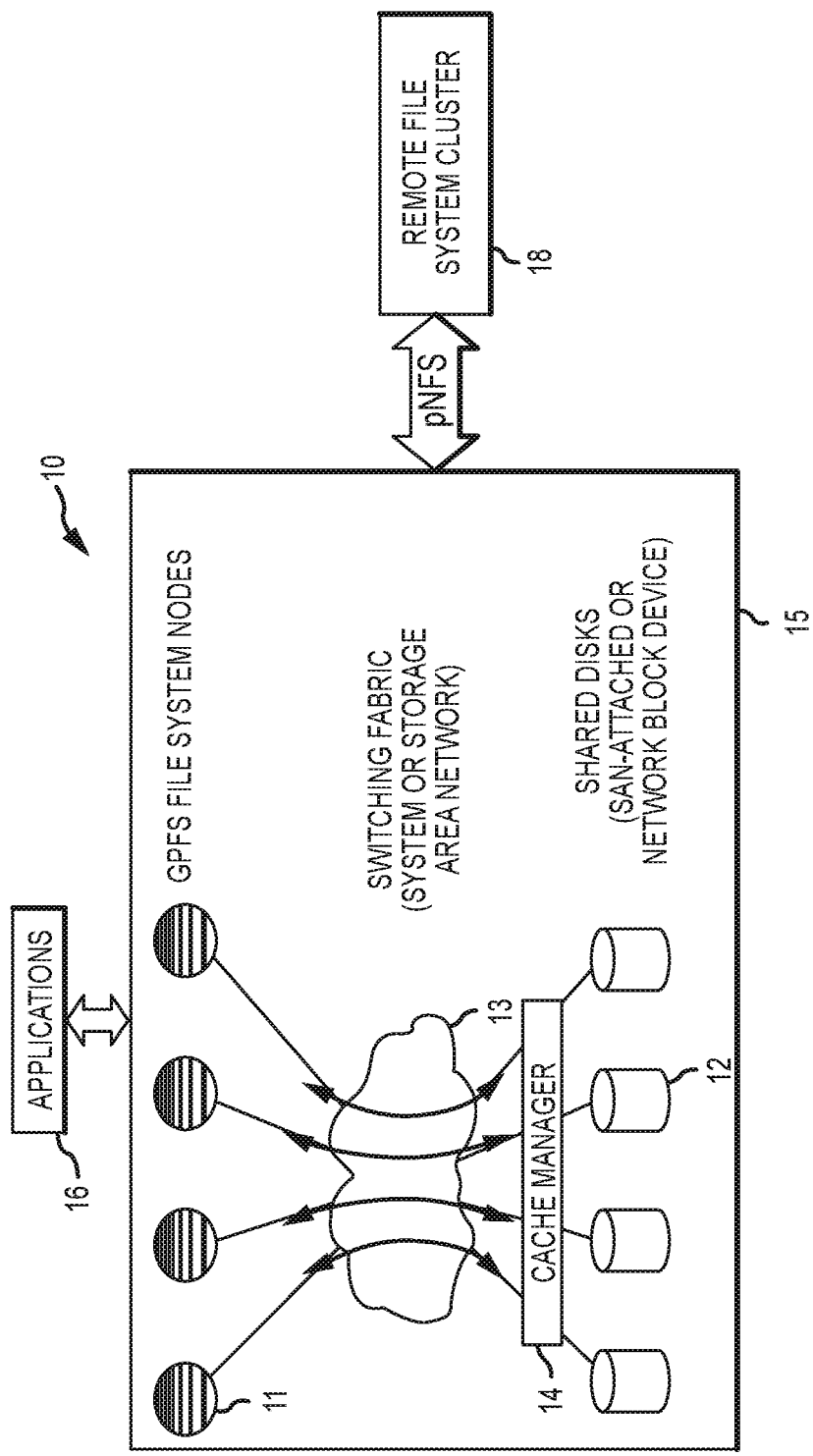
FIG. 1 illustrates a block diagram of a system for caching remote file data in a local cluster file system.

Referring to FIG. 1, a general parallel file system (GPFS) parallel cluster file system 10 comprising a local cached file system cluster 15 that stores cached data, wherein a parallel network file system (pNFS) is used to move the data between the cluster or cache site 15 and a remote cluster file system or home site 18. GPFS is used for both file system clusters 15 and 18 to provide concurrent high-speed file access across multiple file system computing nodes of a cluster. The cached cluster includes the file system 15, computing nodes 11 (e.g., processors or processing devices) that support the GPFS file system and the applications 16 that use it. The nodes 11 are connected to storage media 12, such as shared disks or disk subsystems, over a switching fabric 13. A cache manager 14 maintains cached data in the storage media 12. All nodes 11 in the cluster have equal access to all disk 12. Files are striped across all disks 12 in the file system where the number of disks 12 can range from tens to several thousand disks. In addition to balancing the load on the disks, striping achieves the full throughput that a disk subsystem is capable of by reading and writing the blocks in parallel.

The switching fabric 13 that connects file system nodes 11 to the shared disks 12 may comprise a storage area network (SAN) such as fibre channel or internet small computer system interface (iSCSI). Alternatively, individual disks 12 may be attached to some number of I/O server nodes that allow access from file system nodes 11 through a software layer running over a general-purpose communication network, such as IBM Virtual Shared Disk (VSD). Regardless of how shared disks 12 are implemented, the GPFS only assumes a conventional block I/O interface with no particular intelligence at the disks 13. Parallel read-write disk accesses from multiple nodes 11 in the cluster 15 are synchronized to prevent corruption of both user data and file system metadata. In an embodiment, the cluster 15 uses distributed locking to synchronize access to shared disks 12. Wherein distributed locking protocols ensure file system consistency regardless of the number of nodes 11 that simultaneously read from and write to a file system on the disks 12 on behalf of an application 16, while at the same time allowing data migration parallelism to achieve maximum throughput.

For remote accesses over a wide area network (WAN), pNFS clients access storage devices in a remote cluster file system in parallel. This is achieved by separating the data and metadata paths, and by moving the metadata server out of the data path. As a result, each pNFS client can leverage the full aggregate bandwidth of the cluster file system. Using pNFS, clients can query the metadata server to determine the layout of how files are distributed across data servers. Layouts are maintained internally by the metadata server. Based on the file layout, the client is able to directly access the data servers in parallel. A pNFS client communicates with the data servers using a variety of storage access protocols, including network file system version 4 (NFSv4) and iSCSI/Fibre Channel. The pNFS specification allows for the addition of new layout distributions and storage access protocols, in addition to flexibility for implementation of the back-end storage system.

Figure 2:
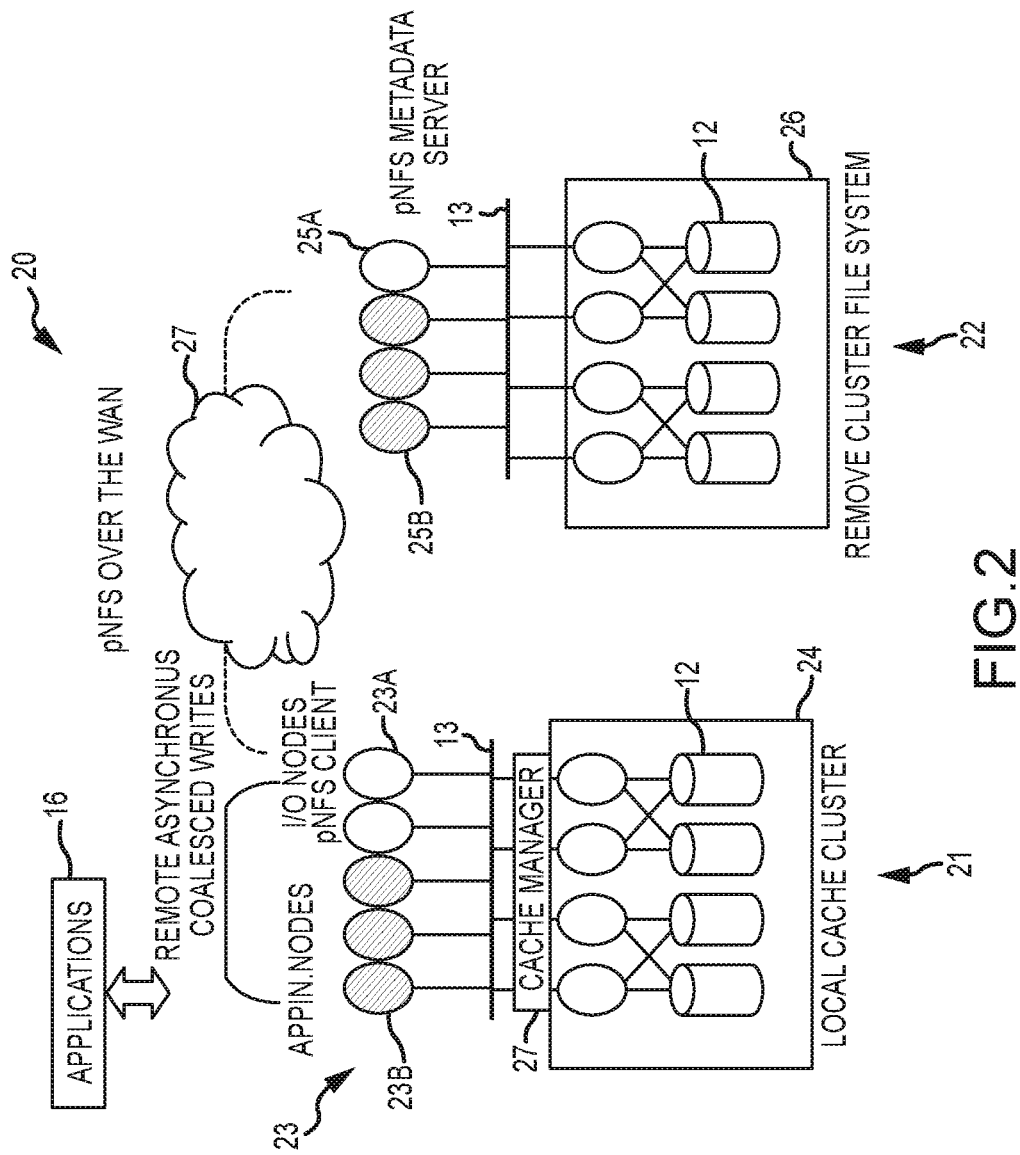
FIG. 2 illustrates a block diagram of a system for caching of remote file data in a cluster file system.

FIG. 2 shows a functional block diagram of an IT system 20. The IT system 20 includes a local cache cluster or cache site 21 and a remote cluster file system or home site 22. Every computing node 23 in the cache cluster 21 has the same access to data cached by a local cache file system 24 of the local cache cluster 21. However, only some of the nodes 23 (i.e., I/O nodes 23A) may have the hardware and software support for remote network connectivity. The I/O nodes 23A act as pNFS clients to fetch the data from the remote cluster 21. The remote cluster 21 may store the data in any portable operating system interface (POSIX) compliant cluster file system that is exported via pNFS (NFS may also be used but with a performance penalty). The I/O nodes 23A are responsible for reading the data from the remote cluster 21 and writing it to the local cache file system 24 and vice-versa. The other nodes of the cluster (i.e., application nodes 23B) service file access requests of applications 16, by reading and writing the cached data in the local cache file system (i.e., cache) 24. The remote file system 22 similarly includes I/O nodes 25A and application nodes 25B.

The application nodes 23B of the local cache file system 21 are also responsible for forwarding access requests by requesting applications 16 to the I/O nodes 23A (i.e., writes to be synchronized with a remote server node 25A of the remote file system 21, and reads to be fetched from the remote server 25A on a local cache miss).

The split between I/O and application nodes 23A, 23B in the local system 21 is conceptual and any node 23 in the local cluster 21 can function both as an I/O node or an application node based on its configuration. The I/O nodes 23A can be viewed as the edge of the cluster cloud that can communicate with the remote cluster 22 while the application nodes 23B interface with the applications.

To access the remote data consistently, the system 20 associates a cache state with every object in the local cache file system 24, wherein the cache state includes the NFS file handle and inode (e.g., data structure) attributes of the corresponding object in the remote file system 26. The inode attributes are stored as an inode or remote inode number to uniquely identify files at the remote file system 26. As multiple nodes 23 in the local system 21 can be accessing the cached data in the local cached file system 24, the accesses may be serialized by a standard GPFS distributed lock management with one of the nodes 23 being the token manager and issuing read and write tokens. The data can be concurrently written at the remote file system 26 of the remote cluster 22, and at the local cache file system 24 of the local cache cluster 21. To reduce the frequent checking of cached attributes with the remote file system 26, the I/O nodes 23A leverage the read and write delegation support of NFSv4. With delegations, the pNFS server 25A of the remote cluster 22 can transfer the ownership of a file to the local cache cluster 21, so that the local cache cluster 21 can safely assume that the data is valid and service local requests.

A cache manager 27 integrated into local cache file system 24 intercepts the application file access requests, wherein the applications simply experience the local cache file system 24 as a traditional GPFS file system. The cache manager 27 of the local cluster 21 mimics the same namespace as the remote cluster 22. Thus browsing through the cache cluster 21 will show the same listing of directories and files as the remote cluster 22. The caching function can be further exported via NFS to enable access by NFS clients.

During a write operation (e.g., a normal delete operation), the application node 23B receives a write request and first writes data to the local cache 24 via the cache manager 27. The application node 23B then sends a message to a designated I/O node 23A to perform the write operation at the remote cluster 22. The I/O node 23A queues the request and returns acknowledgement immediately, allowing the requesting application 16 (e.g., user process) to complete. At a later time, the I/O node 23A reads the data from the local cache 24 and completes the remote write asynchronously. To identify which data is to be written to the remote cluster 22, a dirty bit or flag is used to mark such data indicating that the data has not yet been hardened (i.e., copied to the remote cluster 22). After the data has been hardened, the dirty bit or flag is reset. A remote write operation is sent as an NFS operation to the remote (or home) cluster where the data is written to the home cluster file system.

When a secure delete operation is performed, multiple writes of patterns are additionally performed in conjunction with the deletion of a selected file. In an example, application 16 sends a secure delete request for the selected file, the application node 23B then identifies a set of physical blocks associated with the selected file and invokes Secure Delete logic to perform secure delete on the given set of blocks stored at the local cluster 21. The Secure Delete logic applies a multiple step secure delete procedure on each given set of blocks identified for deletion. Additionally, for each step in the secure delete procedure, a defined pattern write is performed on each block.

In an event that the local cluster 21 becomes disconnected from the remote cluster file system 22 during the secure delete operation, the application node 23B identifies the one or more files for deletion at the local cluster 21 (as noted above, also referred to as the "cache site"), and determines whether the one or more selected files have one or more copies stored at the remote cluster 22 (as noted above, also referred to as the "home site"). If the selected files have copies at the remote cluster 22, the locations of the copies of the one or more selected files at the home site are identified prior to a disconnection event of the cache site from the home site and saved in a file. For example, the locations of the copies are stored as a table. The table may include identifying information such as a remote inode number or other identifier uniquely associated with the copy of the selected file, the name of the copy of the selected file (i.e., the name under which the copy of the selected file is stored at the home site), and a list of data chunk tuples that identify wherein in the remote cluster the copy of the selected file resides. In some embodiments, only a portion of the selected file is to be securely deleted. As such, the start and end blocks of the portion are listed in the table.

Next, while the cache site and the home site are disconnected, the one or more selected files are then securely deleted from the cache site. For example, defined pattern writes are performed for each block of each selected file in order to insure secure deletion of the selected files. In some cases, in addition to the one or more selected files are marked for secure deletion, while other files are marked for normal deletion and/or as new writes and/or as writes on existing files. In such case, the files marked for normal deletion are deleted from the cache site without performing the multiple write patterns. Immediately after the cache site and the home site are reconnected, a secure deletion operation of the copies of the selected files is performed at the home site. In particular, secure deletion occurs prior to or at the start of a resynchronization operation. In some embodiments, the resynchronization operation includes logic that prompts a determination of whether incomplete secure deletions are included at the cache site and if so, causes the home site to perform the secure deletions of the one or more selected files. In embodiments in which other files have been deleted normally and/or have undergone operations for a new write or write on an existing file, synchronization of those files can occur concurrently with the secure deletion of the selected files at the home site.

Figure 3:
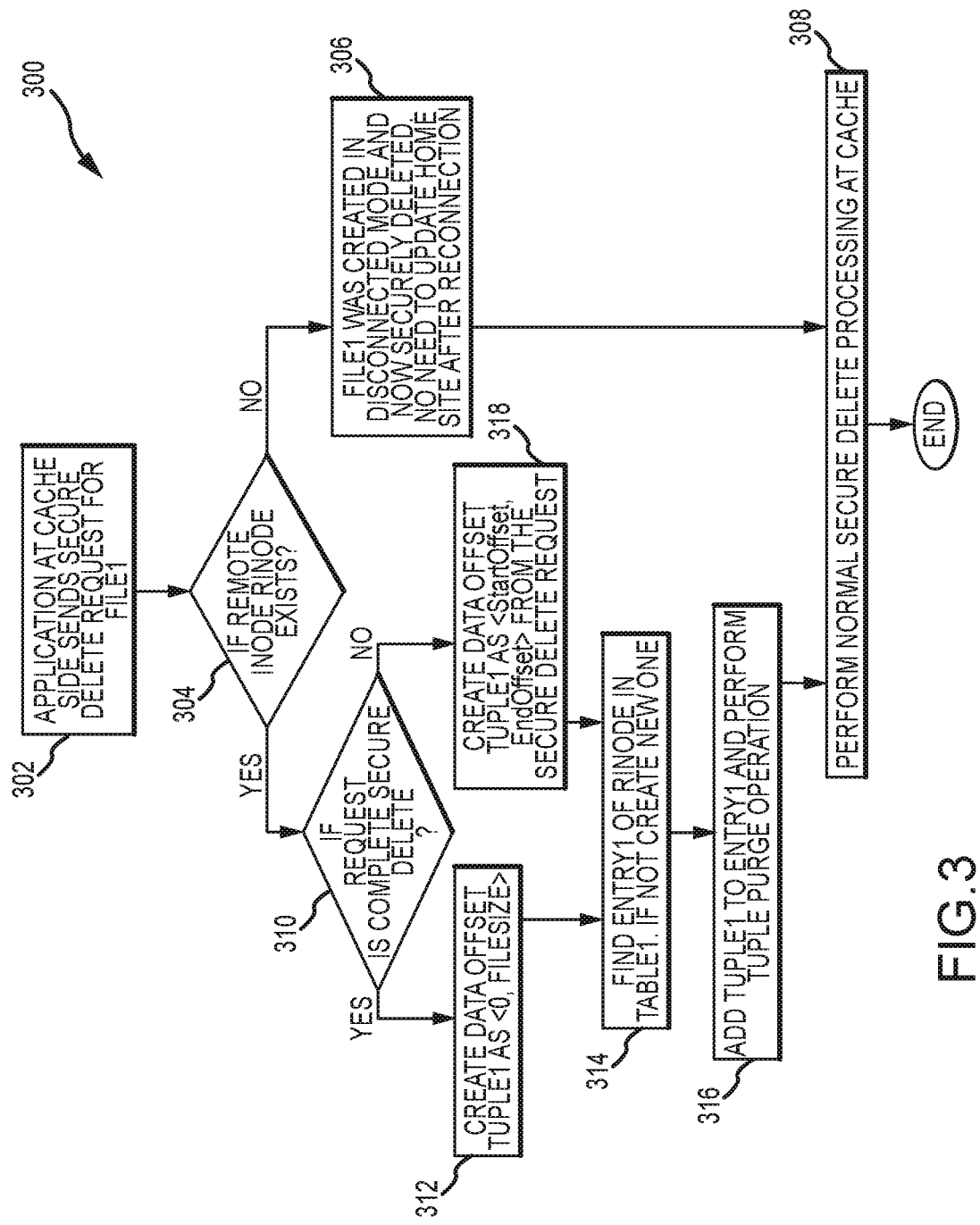
FIG. 3 illustrates a flow diagram of a method of performing a secure delete operation at a cache site in a disconnected mode.

FIG. 3 is a flow diagram of a method 300 of performing a secure deletion operation at a cache site while the cache site is disconnected from the home site, according to an embodiment. Method 300 iterates for each file for which a secure delete request is received. For example, method 300 includes the application 16 at the cache site sending a secure delete request for a selected file (FILE 1) at 302. The cache site determines, from the inode of selected file FILE1, whether a remote inode exists for the selected file FILE1 at 304. If not, no updating takes place at the home site after reconnection at 306 as the non-existence of the remote inode indicates that FILE1 was created while in disconnection mode. Normal secure delete processing is performed at the cache site at 308.

Returning to 304, if a remote inode does exist for the selected file FILE1, a determination is made as to whether the request for the secure delete operation has been completed at 310. If so, a data offset Tuple 1 is created as <0, FileSize> at 312. In particular, the Tuple 1 indicates a portion of data of the selected file for secure deletion. Then an entry (Entry 1) is either created or found in a new or created table (Table 1) at 314. The Tuple 1 indicating the location of the portion of data of the selected file is added to Entry 1 and a purge operation of the tuple (Tuple 1) is performed at 316, followed by normal secure delete processing the cache site at 308.

Referring back to 310, if the request for secure delete has not been completed a data offset Tuple 1 is created from the request at 318. In particular, the Tuple 1 is indicated by values for <StartOffset, EndOffset>. Then an entry (Entry 1) is either created or found in a new or created table (Table 1) at 314. The Tuple 1 indicating the location of the portion of data of the selected file is added to Entry 1 and a purge operation of the tuple (Tuple 1) is performed at 316, followed by normal secure delete processing the cache site at 308.

TABLE below is an example of a secure delete information table such as Table 1 referred to above. The secure delete information table maintains the information about the files on which partial/complete secure delete operations have been performed during the disconnected mode. The table is maintained at the cache site. Entries are added and/or updated by the cache site upon receipt of a secure delete request of the file in the disconnected mode and is later referred to by resynchronization operation logic during reconnection.

TABLE

| Remote Inode No. | File Name | List of Data Chunk Tuples |
|---|---|---|
| 10012 | vipInfo.dat | <100,200>, <400,500> |
| 20025 | Customer.db | <0,20000> |
| 15000 | Finance.xls | <1000,2000>, <4000,5000> |

As shown, the left column of TABLE includes the remote inode number for selected files to be deleted. The file name of the selected file (e.g., how the file is named at the home site) is listed in the middle column. The right column includes lists of data chunk tuples for each file. TABLE has three total entries. Thus, for example, a first entry (for example, an Entry 1) for a file located at remote inode identifier number 10012 at the home site is saved under the file name vipInfo.dat and includes two tuples in its list of data chunk tuples. A second entry for a file located at remote inode 20025 is saved under the file number Customer.db and includes one tuple in its list of data chunk tuples. Additionally, a third entry in TABLE for a file located at remote inode 15000 is saved under the file name Finance.xls and includes two tuples in its list of data chunk tuples. The data tuples that are included in the lists are those portions of the file that are marked as needing to be subjected to a secure delete operation at the home site.

Figure 4:
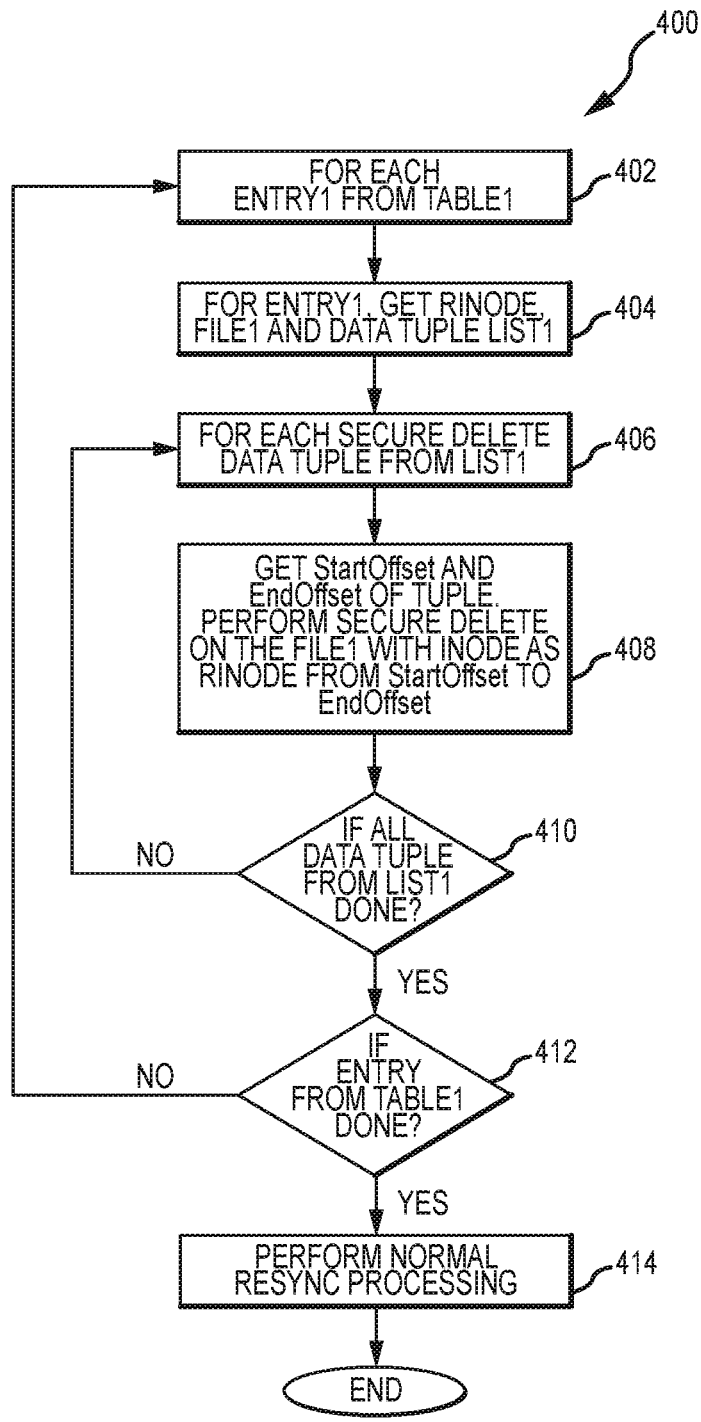
FIG. 4 illustrates a flow diagram of a method of performing a secure delete operation at a home site at the start of a resynchronization operation.

Eventually, the cache site and the home site reconnect, and secure deletion is performed at the home site. FIG. 4 illustrates a flow diagram of a method 400 of performing a secure delete operation at the home site in such case. Method 400 is performed for each entry Entry 1 in Table 1 at 402. With reference to Table 1, the home site refers to an entry Entry 1 and obtains the remote inode number, file name, and data tuple list at 404. Next, a secure delete operation is performed at the home site for each data tuple in the data tuple list at 406. In an embodiment, StartOffset and EndOffset of the data tuple are obtained and a secure delete operation is performed on the file associated with the remote inode number, and in particular, on the blocks indicated by the StartOffset and EndOffset at 408.

A determination is made as to whether the data tuple list is completed at 410. If not, the method 400 iterates at 406. If so, a determination is made as to whether the secure deletion operation is complete for the entry Entry 1 in Table 1 at 412. If not, the method iterates at 402. If so, normal resynchronization processing is performed at 414, and the method 400 ends.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, or any suitable combination of the foregoing. Examples of a physical computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Computer code embodied on a computer-readable medium may be transmitted using any appropriate medium, including but not limited to wireless, wired, optical fiber cable, radio frequency (RF), etc., or any suitable combination of the foregoing. Computer code for carrying out operations for aspects of the present invention may be written in any static language, such as the "C" programming language or other similar programming language. The computer code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or communication system, including, but not limited to, a local area network (LAN) or a wide area network (WAN), Converged Network, or the connection may be made to an external computer (for example, through the Internet using an Internet Service Provider).

Aspects of the present invention are described above with reference to flow diagrams and/or block diagrams of methods, apparatus (systems) and computer program products according to embodiments of the invention. It will be understood that each block of the flow diagrams and/or block diagrams, and combinations of blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flow diagram and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagram and/or block diagram block or blocks.

The flow diagrams and block diagrams in the above figures illustrate the architecture, functionality, and operation of possible implementations of systems, methods and computer program products according to various embodiments of the present invention. In this regard, each block in the flow diagrams or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow diagrams, and combinations of blocks in the block diagrams and/or flow diagram, can be implemented by special purpose hardware-based systems that perform the specified functions or acts, or combinations of special purpose hardware and computer instructions.

What is claimed is:

1. A method of performing a secure delete operation in a wide area network (WAN) including a cache site and a home site, the method comprising:
   during a disconnection event of the cache site and the home site, identifying and receiving a request to perform a secure deletion of a file at the cache site;
   determining whether the file has a copy stored at the home site;
   detecting a location of the copy at the home site prior to a disconnection event of the cache site from the home site;
   in response to the secure deletion of the file not being complete during the disconnection event, indicating on a table a remote inode number assigned to the copy associated with the file at the home site, a name under which the copy is saved, and a list of data chunk tuples specifying selected data of the copy to undergo secure deletion;
   securely deleting the file from the cache site during the disconnection event by performing defined write patterns for each block of the file; and
   identifying the file for secure deletion by identifying the selected data in the file for secure deletion on the cache site; wherein:
      the step of detecting the location includes detecting a location of the selected data in the file at the home site prior to the disconnection event.

2. The method of claim 1, wherein the step of receiving a request to perform a secure deletion includes identifying the file for secure deletion and identifying selected data in the file for secure deletion at the cache site.

3. The method of claim 2, wherein detecting the location includes detecting the location of the selected data in the file at the home site prior to the disconnection event.

4. The method of claim 1, wherein performing the secure deletion includes triggering the secure deletion during a resynchronization process between the home site and the cache site.

5. The method of claim 1, further comprising synchronizing data between the cache site and the home site, after performing secure deletion of the copy at the home site.

6. The method of claim 1, further comprising:
   synchronizing the cache site and the home site for data other than the identified file for secure deletion; and
   performing secure deletion of the copy of the identified filed for secure deletion at the home site during synchronizing.

7. A system of performing a secure delete operation in a wide area network (WAN) comprising:
   a computer processor;
   a cache site;
   a home site; and
   a network server providing communication between the cache site and the home site, the network server:
      during a disconnection event of the cache site and the home site, identifying and receiving a request to perform a secure deletion of a file at the cache site;
      determining whether the file has a copy stored at the home site;
      detecting a location of the copy at the home site prior to a disconnection event of the cache site from the home site;
      in response to the secure deletion of the file not being complete during the disconnection event, indicating on a table a remote inode number assigned to the copy associated with the file at the home site, a name under which the copy is saved, and a list of data chunk tuples specifying selected data of the copy to undergo secure deletion;
      securely deleting the file from the cache site during the disconnection event by performing defined write patterns for each block of the file; and
      identifying the file for secure deletion by identifying the selected data in the file for secure deletion on the cache site; wherein:
         the step of detecting the location includes detecting a location of the selected data in the file at the home site prior to the disconnection event.

8. The system of claim 7, wherein the network server is receiving a request to perform a secure deletion by identifying the file for secure deletion and identifying selected data in the file for secure deletion at the cache site.

9. The system of claim 8, wherein the network server is detecting the location by detecting the location of the selected data in the file at the home site prior to the disconnection event.

10. The system of claim 7, wherein the network server is performing the secure deletion by triggering the secure deletion during a resynchronization process between the home site and the cache site.

11. The system of claim 7, wherein the network server is synchronizing data between the cache site and the home site, after performing secure deletion of the copy at the home site.

12. The system of claim 7, wherein the network server is:
   synchronizing the cache site and the home site for data other than the identified file for secure deletion; and
   performing secure deletion of the copy of the identified filed for secure deletion at the home site during synchronizing.

13. A computer program product for performing a secure delete operation in a wide area network (WAN) including a cache site and a home site, the computer program product having non-transitory computer-readable program code portions stored therein adapted for:
   during a disconnection event of the cache site and the home site, identifying and receiving a request to perform a secure deletion of a file at the cache site;
   determining whether the file has a copy stored at the home site;
   detecting a location of the copy at the home site prior to a disconnection event of the cache site from the home site;
   in response to the secure deletion of the file not being complete during the disconnection event, indicating on a table a remote inode number assigned to the copy associated with the file at the home site, a name under which the copy is saved, and a list of data chunk tuples specifying selected data of the copy to undergo secure deletion;
   securely deleting the file from the cache site during the disconnection event by performing defined write patterns for each block of the file; and
   identifying the file for secure deletion by identifying the selected data in the file for secure deletion on the cache site; wherein:
      the step of detecting the location includes detecting a location of the selected data in the file at the home site prior to the disconnection event.

14. The computer program product of claim 13, wherein the step of receiving a request to perform a secure deletion includes identifying the file for secure deletion and identifying selected data in the file for secure deletion at the cache site.

15. The computer program product of claim 14, wherein detecting the location includes detecting a location of the selected data in the file at the home site prior to the disconnection event.

16. The computer program product of claim 13, wherein performing the secure deletion includes triggering the secure deletion during a resynchronization process between the home site and the cache site.

17. The computer program product of claim 13, further adapted for synchronizing data between the cache site and the home site, after performing secure deletion of the copy at the home site.

18. The computer program product of claim 13, further adapted for:
- synchronizing the cache site and the home site for data other than the identified file for secure deletion; and
- performing secure deletion of the copy of the identified filed for secure deletion at the home site during synchronizing.

* * * * *